March 10, 1931.  E. J. S. SWANSON  1,786,062

CONDUIT FITTING

Filed Aug. 7, 1926

Elmer J. S. Swanson
INVENTOR.

BY
ATTORNEYS.

Patented Mar. 10, 1931

1,796,062

UNITED STATES PATENT OFFICE

ELMER J. S. SWANSON, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed August 7, 1926. Serial No. 127,808.

In the use of conduit fittings it is frequently desirable to reduce the size of the opening of the fitting so as to connect it with a smaller conduit than the opening to the fitting. The present invention is designed to accomplish this purpose with relation to fittings which may be used with threadless conduits. Features and details of the invention will appear from the specification and claims.

In the accompanying drawings various adaptations of the invention are shown as follows:—

Figure 1:
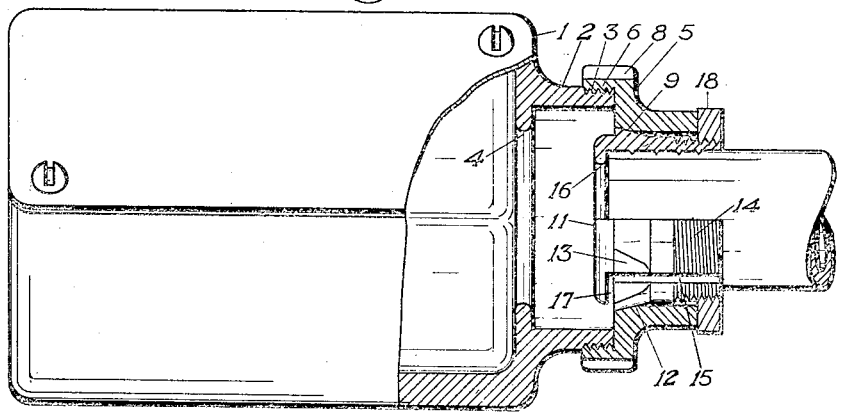
Figure 3:
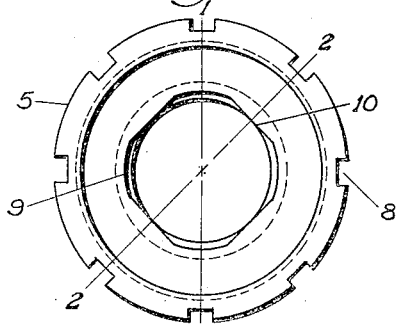

Fig. 1 shows a side elevation, partly in section, on the line 1—1 in Fig. 3.

Figure 2:
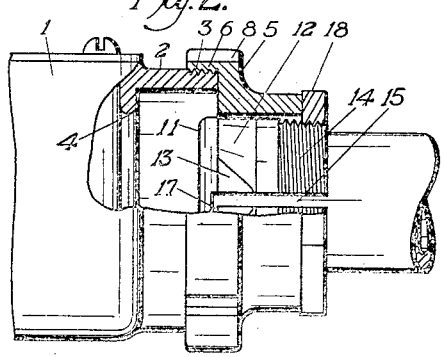

Fig. 2 a similar view, the section being on the line 2—2 in Fig. 3.

Fig. 3 an end view of the reducing member.

Figure 4:
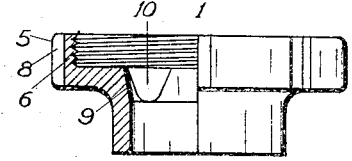

Fig. 4 a side elevation of the same, partly in section.

1 marks the body member which as exemplified is in the form of a conduit box but it will be understood that the invention is not limited to this specific fitting. The body member has a conduit receiving extension 2 and this is provided with an exterior screw thread 3 to which various conduit securing means may be attached. The extension is provided with a conduit guard lip 4 at its inner end.

A conduit reducing member 5 has a flanged end 6 which is internally screw-threaded and adapted to engage the screw threads 3. It is provided with a wrench-hold edge 8 by means of which it may be readily turned to place. The reducing member is also provided with a tapered inner surface 9 and flats, or out of round portions 10.

A contractible sleeve 11 is arranged in the reducing member. This sleeve has a tapered wedging surface 12 adapted to engage the surface 9. It also has flats 13 adapted to engage the flats 10 in the reducing member. The outer end of the sleeve is screw-threaded at 14 and is provided with a longitudinal slit 15 to render it contractible. It has an inner guard portion 16 which is separated from the body of the sleeve by a circumferential slit 17. A nut 18 is arranged on the outer end of the sleeve and is adapted to draw the same into wedging engagement with the reducing member. It will be noted that the reducing member is adapted to receive a threadless conduit securing means such as is indicated in the application of Howard A. Selah, #23,348, filed Apr. 15th, 1925, issued as Patent No. 1,683,413, dated Sept. 4, 1928.

What I claim as new is:—

1. In a conduit fitting, the combination of a body having an externally screw-threaded extension thereon having a conduit-receiving opening; a reducing member having an internal screw thread adapted to screw on to the extension, said reducing member having a conduit receiving opening adapted to receive a threadless conduit securing means; and a conduit securing means in the reducing member comprising a contractible sleeve having wedging engagement with the reducing member; and a screw on the sleeve drawing the sleeve endwise relatively to the reducing member to contract the same.

2. In a conduit fitting, the combination of a body having an externally screw-threaded extension thereon having a conduit receiving opening; a reducing member having an internal screw thread adapted to screw on to the extension, said reducing member having a conduit receiving opening; and a conduit securing means arranged in the reducing member comprising a contractible sleeve having a flaring inner end adapted to contact with wedging engagement the inner wall of the reducing member, said sleeve having a longitudinal slit and a nut on the outer end of the sleeve drawing the sleeve into the reducing member.

In testimony whereof, I have hereunto set my hand.

ELMER J. S. SWANSON.